United States Patent Office 3,679,618
Patented July 25, 1972

3,679,618
ELECTRODEPOSITION OF FLUOROCARBON POLYMERS
James E. Lohr, Drexel Hill, Pa., assignor to E. I. du Pont de Nemours and Company, Wilmington, Del.
No Drawing. Filed Oct. 7, 1969, Ser. No. 864,552
Int. Cl. C09d 3/52, 3/56; C23b 13/00
U.S. Cl. 260—21                               6 Claims

ABSTRACT OF THE DISCLOSURE

The application of fluorocarbon polymer coatings on metal articles by electrodeposition is the subject of this invention; aqueous dispersions containing carboxylic acid polymer having an acid number of about 6–25 neutralized with a water soluble basic compound, such as ammonia, an amine, metal hydroxide, contain uniformly dispersed fluorocarbon polymer particles which can be electrodeposited on metal articles. Electrodeposition of fluorocarbon polymers is particularly useful in coating irregular shaped objects, such as screws, nuts and bolts, and is also useful in coating objects, such as cookware, tools and the like.

BACKGROUND OF THE INVENTION

This invention relates to an improved aqueous dispersion useful for electrocoating metal articles with a fluorocarbon polymer and to an improved electrocoating process for depositing fluorocarbon polymers. In particular, this invention relates to an improved aqueous polymeric dispersion in which the film-forming polymer is a low acid number carboxylic polymer and has uniformly dispersed therein fluorocarbon polymer particles, and to an improved electrocoating process for applying the carboxylic polymer and the fluorocarbon polymer.

It is known to electrocoat fluorocarbon polymers as shown in British Pat. 723,072, published Feb. 2, 1955; British July 2, 1968, by coating a fluorocarbon polymer article with an ionizable surfactant. Also, Graham U.S. 2,800,447, issued July 23, 1957, shows a process for controlling the pH of an electrocoating composition which is used to electrodeposit polytetrafluoroethylene particles, and shows the coating of these polytetrafluoroethylene particles with an ionizable resin so that they can be electroposited. Gilchrist 3,230,162, issued Jan. 18, 1966 and Gilchrist 3,382,165, issued May 7, 1968, both disclose the use of extender resins, such as polytetrafluoroethylene resins with a carboxylic polymer in an electrocoating process. However, none of these references recognize the advantages of using a low acid number carboxylic polymer in electrodepositing fluorocarbon polymer articles, such as, higher electrodeposition efficiency, improved film properties and the like.

The novel composition of this invention has been found particularly useful in coating screws, nuts, bolts and other irregular shaped objects with a fluorocarbon polymer and the composition can also be used as a primer for fry pans and other cookware.

SUMMARY OF THE INVENTION

The novel aqueous dispersion of this invention which is useful for electrodepositing fluorocarbon resins on metal articles has a pH of about 5–10 and comprises: water, 2–35% by weight of a uniformly dispersed film-forming polymer that is a carboxylic acid polymer that has an acid number of about 6–25 and a molecular weight of about 1000–20,000;

this film-forming carboxylic acid polymer is neutralized with a water-soluble basic compound which is either ammonia, a water-soluble metal hydroxide, a water-soluble amine, a water-soluble polyamine or a water-soluble hydroxy amine;
and contains a uniformly dispersed fluorocarbon polymer particles in a fluorocarbon polymer to carboxylic acid polymer ratio of about 5:100 to 50:100.

DESCRIPTION OF THE INVENTION

One preferred aqueous electrocoating dispersion of this invention has as the film-forming polymer about 95–50% by weight based on the total weight of the film-forming polymer of a carboxylic acid polymer that has an acid number of about 15–22 and correspondingly about 5–50% by weight of a water-dispersible thermosetting resin. Preferably, the aqueous dispersion has a pH of about 7–8.5 and a film-forming polymer solids content of about 5–15% by weight and has polytetrafluoroethylene as the fluorocarbon polymer.

The term "acid number" is defined as the number of milligrams of potassium hydroxide necessary to neutralize 1 gram of polymer.

A wide variety of polymers can be used as the film-forming polymer in the novel aqueous dispersion of this invention providing the polymer has carboxylic acid groups, an acid number of 6–25 and a molecular weight of about 1000 to 20,000. For example, alkyd resins, epoxy ester resins, acrylic resins and the like can be used.

Alkyd resins can be used to form the novel aqueous electrocoating dispersion of this invention. These alkyd resins are prepared from a polyhydric alcohol and polycarboxylic acid using well known techniques for preparing these resins. The following conventional fatty acids are used in forming the alkyd resins useful in this invention: linoleic, linolenic, eleostearic, ricinoleic and dehydrated ricinoleic. These fatty acids are derived from oils, such as tung oil, linseed oil, soya oil, dehydrated castor oil and rosin free tall oil. The acids from dehydrated castor oil and rosin free tall oil are preferred. Other polycarboxylic acids or their anhydrides, such as phthalic, maleic, sebacic, trimellitic and adipic acids can be used with the above fatty acids to form the alkyd resins useful in this invention.

A wide variety of polyhydric alcohols can be used in forming the alkyd resins, such as glycerol, pentaerythritol, ethylene glycol, propylene glycol, diethylene glycol, 1,5-pentane diol, bisphenol A-(para,para-isopropylidenediphenol), hydrogenated bisphenol A-(4,4-isopropylidene dicyclohexanol), bis-phenol F-(4,4'-dihydroxydiphenyl methane) and the like.

One preferred alkyd resin is from hydrogenated bisphenol A, dehydrated castor oil, trimellitic anhydride and 1,5-pentanediol.

Acrylic polymers having pendent carboxyl groups are exceptionally useful film-forming materials used in this invention. In general, the acrylic polymers having major portions of a methacrylic acid ester and/or an acrylic acid ester in which the esters are of an alcohol having 1–12 carbon atoms and contain a copolymerizable $\alpha,\beta$-unsaturated carboxylic acid. The following are typical useful methacrylic acid esters and acrylic acid esters: ethyl acrylate, propyl acrylate, isopropyl acrylate, butyl acrylate, isobutyl acrylate, secondary butyl acrylate, hexyl acrylate, 2-ethylhexyl acrylate, octyl acrylate, nonyl acrylate, lauryl acrylate and the like; methyl methacrylate, propyl methacrylate, isobutyl methacrylate, butyl methacrylate, secondary butyl methacrylate, tertiary butyl methacrylate, hexamethyl methacrylate, 2-ethylhexyl methacrylate, nonyl methacrylate and lauryl methacrylate. The copolymerizable $\alpha,\beta$-unsaturated carboxylic acids used to form these acrylic polymers are, for example, acrylic acid, methacrylic acid, itaconic acid, and the like.

Preferably, the acrylic polymers contain a hydroxyalkyl monomers, such as hydroxyalkyl methacrylate, or a hydroxyalkyl acrylate, or a combination thereof. These monomers have an alkyl group of 1–8 carbon atoms. Typically useful hydroxyalkyl monomers are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, hydroxyoctyl acrylate, and the like. Preferred are hydroxyalkyl methacrylates and acrylates in which the alkyl group contains 2–4 carbon atoms.

Esterified epoxy resins are also useful as film-forming polymers used in this invention. One preferred epoxy resin is an epoxy hydroxy polyether of a condensate of chlorohydrin and bis-(4-hydroxyphenol)alkane, the chlorohydrin preferably is epichlorohydrin or glycerol chlorohydrin. These epoxy hydroxy resins can be esterified with a conventional drying oil fatty acid, such as dehydrated castor oil fatty acids, linseed oil fatty acids, oiticia oil fatty acids, soya oil fatty acids, tung oil fatty acids and the like. Polycarboxylic acids, such as trimellitic acid or its anhydride, can also be used to form these esterified epoxy resins.

One preferred esterified epoxy resin is the reaction product of an epoxy hydroxy polyether, e.g., Epon 1004, soya oil fatty acids and trimellitic anhydride.

Polyesters which are formed from dicarboxylic acid and a polyol can also be used as the film-forming polymers of this invention. Typically useful saturated aliphatic carboxylic acids or their anhydride, which can be used in forming these polyesters having 2–10 carbon atoms, are adipic, glutaric acid, pimelic acid, suberic acid, azelaic acid, sebacic acid and the like. The preferred acid of this group is adipic acid. Aromatic dibasic acids or their anhydrides can also be used, such as phthalic acid, isophthalic acid, terephthalic acid, uvitic acid, cuminic acid and the like. Polybasic aromatic acids or their anhydrides, such as trimellitic acid, pyromellitic acid, benzenepentacarboxylic acid and the like can also be used.

Many polyols can be reacted with the aforementioned acids to form these polyesters. Particularly useful polyols are, for example, ethylene glycol, diethylene glycol, propylene glycol, 1,4-butane diol and 1,5-pentane diol. Polyols which contain more than 2 hydroxy groups can also be used, such as, glycerin, pentaerythritol, trimethylolethane and trimethylolpropane.

Preferably, a thermosetting resin is used with the aforementioned polyesters to form the film-forming components used in this invention.

In general, it is preferred to use a thermosetting resin with the aforementioned polymers in the amount of about 5–50% by weight based on the weight of the film-forming components. A thermosetting resin can be used providing the resin is dispersible in water and compatible with the aforementioned polymer. Particularly useful resins are, for example, phenol formaldehyde, urea/formaldehyde, melamine/formaldehyde, alkylated melamine/formaldehyde resins, benzoguanamine/formaldehyde resins and the like.

One preferred resin is an alkylated melamine/formaldehyde resin that has 1–4 carbon atoms in the alkyl group. These resins can be prepared by conventional techniques in which a lower alkyl alcohol, such as methanol, butanol, propanol, isopropanol, ethanol, and the like, is reacted with the melamine formaldehyde resin to provide pendent alkoxy groups. One preferred melamine resin used in this invention because of its availability and since it forms a high quality coating composition is a methylolated melamine/formaldehyde resin, such as hexamethoxymethyl melamine.

Another preferred thermosetting resin used in the novel process of this invention which gives a high quality product is tetrakisethoxybismethoxymethyl melamine, which is sold under the trade name "Cymel" XM-1116.

In addition to giving the coating thermosetting properties, these resins provide corrosion resistance, hardness, solvent, alkali and heat resistance to the coating.

In forming the coating composition used in the novel process of this invention, the acid containing polymer is blended with one of the aforementioned thermosetting resins. This blend is often relatively insoluble in water and difficult to disperse. A solvent for the polymer blend which is miscible with water in amounts of about 2–10% based on the total weight of the polymer blend can be used to dissolve this polymer blend and aid in dispersing the blend in the aqueous bath. The following are some of the many solvents which can be used: diacetone alcohol, ethyl alcohol, methyl alcohol, ethyl cellosolve, butylcellosolve, cyclohexanol, tetrahydrofuran, tertiary butyl alcohol, isopropyl alcohol and the like.

Particular care must be taken in forming the stable aqueous electrocoating composition containing the film-forming polymer and the fluorocarbon polymer. One preferred method is to blend the aforementioned carboxylic acid polymer with the thermosetting nitrogen resin and optionally, blend the solvent with these resins. The resin is then neutralized with a water-soluble basic compound. Water is then slowly added to the solution, however, care is taken that the polymer remains in solution and does not invert to an aqueous dispersion. The addition of water is stopped at a point at which the aqueous fluorocarbon polymer dispersion can be added while the polymer and the fluorocarbon dispersion remain in solution and do not invert to an aqueous dispersion. After the fluorocarbon polymer dispersion is thoroughly blended with the polymer solution, water is then slowly added with constant agitation to form the stable aqueous electrocoating composition of this invention.

The water-soluble basic compounds which are particularly suitable for forming an electrocoating composition of this invention and also can be used for adjusting the pH of the bath to about 5–10 and preferably, to about 7–8.5, are, for example, ammonia, primary amines, secondary amines, tertiary amines, polyamines, hydroxy amines, water-soluble metal hydroxides. The following are examples of these compounds: monoethylonolamine, diethylonolamine, triethylonolamine, N-methylethanolamine, N-aminoethanolamine, N-methyldiethanolamine, monoisopropylanolamine, diisopropylanolamine, triisopropylanolamine, hydroxyamine, butanolamine, hexanolamine, methyldiethanolamine, octylamine, sodium hydroxide, potassium hydroxide, lithium hydroxide, ethylenediamine, diethylenetriamine, triethylenetetramine, hexamethylenetetraamine, tetraethylenediamine, propylenediamine, 1,3 - diaminopropane, diamino-bis-propylamine, mono-, di- and tri-alkyl amines wherein the alkyl group has 1–8 carbon atoms.

The aqueous fluorocarbon polymer dispersions used in this invention, preferably have a fluorocarbon polymer solids content of 30 to 65%. The types of fluorocarbon polymers that are useful in this invention are, for example, polytetrafluoroethylene, chlorotrifluoroethylene polymer, fluorinated ethylene and propylene polymers, vinylidene fluoride polymers, hexafluoropropylene polymers and the like. Preferably, dispersions of polytetrafluoroethylene are used in forming the aqueous dispersions used in this invention.

Under some circumstances, it may be desirable to blend pigments, dyes or lakes with the aqueous electrocoating composition of this invention. One method is to prepare a mill base by dispersing the pigment in neutralized film-forming polymer solution, and then blend this mill base with the neutralized film-forming polymer dispersion used to form the electrocoating composition. After this, the fluorocarbon polymer dispersion is blended with the film-forming polymer dispersion as indicated above. A variety of well known standard pigments can be used, such as metal oxides, titanium dioxide, zinc oxide, metal hydroxide, chromates, lead chromates, organic dyes, iron blues, organic reds, maroons and the like.

Often it is preferred that the metal article being electrocoated with the novel composition of this invention have a surface treated to provide a surface to which the electrodeposited film will adhere. One preferred treatment is to phosphatize the surface of the metal with an aqueous solution of phosphoric acid or a salt of phosphoric acid. If a steel substrate is used a coating of iron phosphate is deposited on the steel substrate, preferably, in amounts of 25–75 milligrams per square foot. Other compositions of this type can also be used.

In a typical electrocoating process, the article to be electrocoated is positioned in the conventional electrocoating cell and forms an anode of the electrocoating cell. The novel electrocoating composition of this invention is placed in the cell. An electric current is passed through the cell and the negatively charged film-forming polymer particles and the fluorocarbon polymer particles coated with the film-forming polymer particles are simultaneously deposited on the metallic anode. When the coating reaches the desired thickness, the article is removed from the bath, washed with water and baked at about 75–210° C. for 10–30 minutes to give a tough, durable, smooth coating.

The coated article may also be subjected to substantially higher temperatures, such as 320–430° C. for 15–60 minutes. These high temperatures will either char or evaporate the film-forming polymer and leave a coating of coalesced fluorocarbon polymer. If the film-forming polymer is a cross-linked polymer, usually a gray, black or brown colored coating will result. The polymer is charred into a carbon matrix which provides excellent adhesion for the fluorocarbon polymer coating to the metallic substrate. If a noncross-linked polymer is used, for example, an acrylic polymer, and the coating is baked at the elevated temperature, coating of a fluorocarbon polymer will result since the noncross-linked polymer is vaporized.

In a typical electrocoating process using the novel composition of this invention, the current density used in the cell generally should not exceed 0.3 ampere per square inch anode surface which is immersed in the bath and it is preferable to use less amperage. Voltages of about 50–500 volts can be used, but voltages of about 150–300 volts are preferred.

In any continuous electrocoating process in which metal articles are continuously fed into the electrocoating bath and removed, such as would occur in an automated line, it is preferable to continuously replenish the bath as the film-forming polymer and fluorocarbon polymer are being electrodeposited on the articles being coated. However, the replenishment composition is slightly different from the electrocoating bath utilized in this invention. As the polymer is being electrodeposited, the neutralizing agent, e.g., the amine, remains in the bath. Therefore, the replenishment concentrate contains sufficiently less of the water-soluble basic compound so that the pH of the bath will remain at a constant level. Also, the replenishment concentrate should have a substantially increased film-forming polymer content and a fluorocarbon polymer content.

One preferred replenishment concentrate has a 20–70% by weight solids content of the film-forming polymer and about 1 to 10% by weight based on the weight of the film-forming polymer neutralized with the water-soluble basic compound as mentioned herein and about 5 to 35% by weight of dispersed fluorocarbon polymer. This replenishment concentrate is fed into the bath at a rate at which the polymer is being removed from the bath by the electrocoating process to keep the bath at optimum polymer solids level and at an optimum pH.

A dialysis membrane or an ion-exchange membrane can be used in the novel process of this invention to remove unwanted products which may be present in the electrocoating composition. These unwanted products in the electrocoating bath result from the addition of water, entrainment of salts on work pieces, excess amine or other neutralization agents which result from the deposition of the anionic polymer and the like. These unwanted by-products accumulate in the bath and if not removed, cause poor quality films and instability of the bath. Typically useful electrodialysis membranes are disclosed in Gilchrist U.S. 3,304,250, issued Feb. 14, 1967, and useful ion-exchange membranes are disclosed in Cooke U.S. 3,419,488, issued Dec. 31, 1968. Both of these patents are hereby incorporated by reference.

These membranes may be positioned in the electrocoating cell and the cell is adapted so that impurities may be removed as shown in the above patents. Another method is to place the membrane in a separate unit and pass the electrocoating composition through the unit to remove impurities and recycle the electrocoating composition into the bath.

The ion-exchange membrane is preferred, particularly those membranes disclosed in columns 2 and 3 of Cooke U.S. 3,419,488. These ion-exchange membranes maintain closer control of pH and selectively remove unwanted cationic by-products which degrade the electrodeposited film and the bath.

The examples which follow illustrate the invention. Quantities are on a weight basis unless otherwise indicated.

EXAMPLE 1

The following electrocoating composition is formed by blending the following ingredients:

| | Parts by weight |
|---|---|
| Portion 1: | |
| Epoxy resin solution—(69.4% polymer solids in butyl Cellosolve wherein the polymer is of soya oil fatty acids/Epon 1004 ¹/trimellitic anhydride, weight ratio 38/59/30, having an acid No. of 17.0) | 93.0 |
| XM-1116 melamine formaldehyde cross-linking resin (tetrakisethoxymethylbismethoxymethyl melamine) | 12.8 |
| Potassium hydroxide solution (45% aqueous solution of potassium hydroxide) | 2.3 |
| Portion 2: | |
| Water | 828.4 |
| Aqueous fluorocarbon polymer dispersion (63% polytetrafluoroethylene solids) | 33.2 |
| Total | 969.7 |

¹ Epon 1004—an epoxy resin having a melting point of 95–105, Gardner Holdt viscosity of Q-U and an epoxide equivalent, i.e., grams of resin containing one gram equivalent of epoxide, of 875–1025 and has the following structural formula:

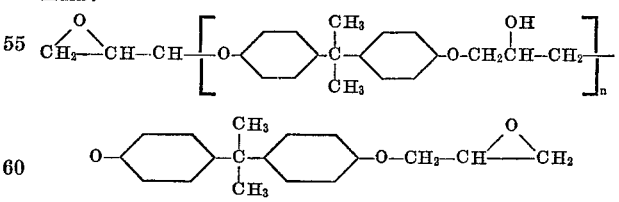

where $n$ is an integer sufficiently large to provide the aforementioned viscosity.

Portion 1 is premixed for about 15 minutes. Water is then slowly added until the neutralized polymer solution is close to the point at which an aqueous dispersion is formed.

The addition of water is stopped before the inversion point is reached, i.e., the point at which the solution becomes an aqueous dispersion of polymer, and the polytetrafluoroethylene dispersion is then added and blended with the polymer solution. At this point, the mixture is still a solution. The remainder of the water is then added to form a stable aqueous dispersion which is useful for electrocoating. The resulting dispersion has a pH of about 8.5, a polymer solids content of film-forming polymer of about 8.0% and a polytetrafluoroethylene to binder ratio of about 26:100.

A steel plate about 2 x 6 x 1/32" is treated on both sides with "Bonderite" 40 which is believed to be essentially zinc phosphate is used for the substrate on which a film is electrodeposited.

A galvanized tank having about a 700 millimeter capacity is filled with the above prepared electrocating composition. A steel panel treated as above is positioned in about the center of the tank and forms the anode of the electrocoating cell, while the tank itself, forms the cathode of the cell. A direct current voltage of about 250 volts is applied for about 1 minute. A 0.9 mil film of a coating is deposited on each side of the steel plate. The coating has excellent adherence to the steel substrate. The coated steel plate is washed and dried and baked at about 175° C. for 30 minutes. The resulting coating on this steel plate is smooth, glossy, tough film and water forms beads on the film.

The panel is then baked at 400° C. for 20 minutes. The resulting coating has a black color but has a smooth appearance and appears to be a coalesced film of polytetrafluoroethylene.

EXAMPLE 2

An electrocoating composition is formed by blending the following ingredients:

| | Parts by weight |
|---|---|
| Portion 1: | |
| Acrylic polymer solution—(50% polymer solids in isopropanol wherein the polymer is of styrene/methyl methacrylate/2-ethylhexyl acrylate/hydroxypropyl methacrylate/methacrylic acid in a weight ratio of 18.7/18.8/45/10/7.5 having an acid No. of 55) | 150.0 |
| Aqueous potassium hydroxide solution (45% by weight potassium hydroxide) | 5.5 |
| Portion 2: | |
| Water | 750.9 |
| Aqueous polytetrafluoroethylene dispersion (63% polytetrafluoroethylene solids) | 31.1 |
| Total | 937.5 |

Portion 1 is premixed for about 15 minutes and then water is slowly added to the solution with constant agitation until the solution is near the inversion point. Care is taken that the polymer remains in solution. The polytetrafluoroethylene dispersion is then added with constant agitation. At this point, the mixture is still in solution and has not inverted to an aqueous dispersion. Water is then slowly added with constant agitation until a stable aqueous dispersion useful for electrocoating is formed. The resulting composition has a pH of about 8.2, a film-forming polymer solids content of about 8.0% and a pigment to binder ratio of 25:100.

Steel panels are primed as in Example 1 and are electrocoated with the above prepared composition using the same procedure as in Example 1. The coated plates are washed, dried and baked as in Example 1 giving a coating of about 0.6 mil thick that is smooth, tough and has excellent adherence to the substrate.

The plate is then baked at 400° C. for 20 minutes. The resulting plate has a light brown coating with a polytetrafluoroethylene surface.

EXAMPLE 3

An electrocoating composition is formed by blending the following ingredients:

| | Parts by weight |
|---|---|
| Portion 1: | |
| Alkyd polymer solution—(63% polymer solids in diacetone alcohol in which the polymer is hydrogenated bisphenol A/dehydrated castor oil/1,5-pentane diol/trimellitic anhydride in a weight ratio of 35.8/23.9/15.5/24.8 and having an acid number of 2–3) | 100.0 |
| XM–1116—Melamine formaldehyde crosslinking agent (tetrakisethoxymethyl bismethoxymethyl melamine) | 12.6 |
| Aqueous potassium hydroxide solution (45% by weight potassium hydroxide) | 2.6 |
| Portion 2: | |
| Water | 798.5 |
| Aqueous polytetrafluoroethylene polymer dispersion (63% solids polytetrafluoroethylene) | 31.3 |
| Total | 945.0 |

Portion 1 is premixed for about 15 minutes and then water is slowly added until the solution is near the inversion point. Care is taken that the polymer remains in solution and does not invert to an aqueous dispersion. The polytetrafluoroethylene dispersion is then added and the composition is thoroughly mixed. At this point, the mixture is still in solution. The remainder of the water is slowly added until a stable aqueous dispersion useful for electrocoating is formed. The resulting dispersion has a film-forming polymer solids of about 8.0%, a pH of about 8 and a pigment to binder ratio of 26/100.

Steel panels primed as in Example 1 are electrocoated with the above prepared composition using the same procedure as in Example 1, except an electrocoating voltage of 200 volts is used. The coated panels are washed, dried and baked as in Example 1 giving a coating of about 0.8 mil thick that is smooth, tough and has an excellent adherence to the substrate.

The panels were subsequently baked at 400° C. for 30 minutes. The panel has a black color and a surface on which beads of water are readily formed, indicating a continuous polytetrafluoroethylene film.

EXAMPLE 4

An electrocoating composition is formed by blending the following ingredients:

| | Parts by weight |
|---|---|
| Portion 1: | |
| Alkyd polymer solution (described in Example 3) | 125.0 |
| Aqueous potassium hydroxide solution (45% by weight potassium hydroxide) | 3.4 |
| Portion 2: | |
| Water | 823.3 |
| Aqueous dispersion of polytetrafluoroethylene (63% solids of polytetrafluoroethylene) | 32.6 |
| Total | 945.0 |

Portion 1 is premixed for about 15 minutes and then water is slowly added with constant agitation until the solution is near the inversion point. Care is taken that the polymer remains in solution and does not invert to an aqueous dispersion. The polytetrafluoroethylene dispersion is then added with constant agitation and is blended with the polymer solution. At this point, the mixture is still in solution. The remainder of the water is slowly added until an aqueous stable dispersion useful for electrocoating is formed. The resulting dispersion has a pH of 8.0, a film-forming polymer solids content of 8.0% and a pigment to binder ratio of 25:100.

Aluminum panels are electrocoated with the above prepared composition using the same procedure as in Example 1. The coated plates are washed, dried and baked as in Example 1, giving a coating about 0.9 mil thick that is smooth, tough and has excellent adherence to the substrate.

The panels are then baked at 400° C. for 30 minutes, giving a panel with a very light gray color and a surface of polytetrafluoroethylene on which water readily forms beads. The gray color of the film indicates that most of the polymeric binder was vaporized in the baking of the film.

What is claimed is:

1. An aqueous dispersion for electrocoating metal articles having a pH of about 5–10 and comprising: water, 2–35% by weight of a uniformly dispersed film-forming polymers consisting essentially of
    (A) about 95–50% by weight, based on the total weight of the film-forming polymers, of a carboxylic acid polymer having an acid number of about 6–25 and a molecular weight of about 1000–20,000 selected from the group consisting of an acrylic polymer, an epoxy ester polymer and an alkyd resin; and
    (B) about 5–50% by weight, based on the weight of the film-forming polymers, of a water dispersible resin selected from the group consisting of phenol/formaldehyde, urea/formaldehyde, melamine/formaldehyde, alkylated melamine/formaldehyde having 1–4 carbon atoms in the alkyl group, benzoguanamine/formaldehyde and tetra-kis-ethoxymethyl-bismethoxymethyl melamine,
        said film-forming carboxylic acid polymer being neutralized with a water-soluble basic compound selected from the group consisting of ammonia, a water-soluble metal hydroxide, a water-soluble amine, a water-soluble polyamide, and a water-soluble hydroxyamine; and
        the dispersion contains uniformly dispersed polytetrafluoroethylene particles in a fluorocarbon polymer to carboxylic acid polymer ratio of about 5:100 to 50:100;
        wherein the acrylic polymer consists essentially of a major portion of a methacrylic acid ester, an acrylic acid ester and an $\alpha,\beta$-unsaturated monocarboxylic acid; the methacrylate ester being selected from the group consisting of methyl methacrylate, propyl methacrylate, isobutyl methacrylate, butyl methacrylate, secondary butyl methacrylate, tertiary butyl methacrylate, hexamethyl methacrylate, 2-ethylhexyl methacrylate, nonyl methacrylate, lauryl methacrylate, hydroxyethyl methacrylate, hydroxypropyl methacrylate, hydroxybutyl methacrylate, and hydroxyoctyl methacrylate;
        the acrylic acid ester being selected from the group consisting of ethyl acrylate, propyl acrylate, isopropyl acrylate, butyl acrylate, isobutyl acrylate, secondary butyl acrylate, hexyl acrylate, 2-ethylhexyl acrylate, octyl acrylate, nonyl acrylate and lauryl acrylate, hydroxyethyl acrylate, hydroxypropyl acrylate, hydroxybutyl acrylate, and hydroxyoctyl acrylate and the $\alpha,\beta$-unsaturated carboxylic acid is selected from the group consisting of acrylic acid, methacrylic acid and itaconic acid;
        the epoxy ester resin consists essentially of an epoxy hydroxy polyether condensate of chlorohydrin and bis-(4-hydroxyphenol)alkane esterified with an acid selected from the group consisting of dehydrated castor oil fatty acids, linseed oil fatty acids, oiticia oil fatty acids, soya oil fatty acids, tung oil fatty acids, trimellitic acid, and trimellitic anhydride;
        the alkyd resin consists essentially of a polycarboxylic acid and a polyol in which the polycarboxylic acid is selected from the group consisting of linoleic acid, linolenic acid, eleostearic acid, ricinoleic acid, dehydrated ricinoleic acid, adipic acid, glutaric acid, pimelic acid, suberic acid, azelaic acid, sebacic acid, phthalic acid, isophthalic acid, terephthalic acid, uvitic acid, cuminic acid, trimellitic acid, pyromellitic acid, benzenepentacarboxylic acid, and the polyol is selected from the group consisting of ethylene glycol, diethylene glycol, propylene glycol, 1,4-butane diol and 1,5-pentane diol, glycerine, pentaerythritol, trimethylolethane, trimethylolpropane, para,para-isopropylidenediphenol, 4,4-isopropylidene dicyclohenanol, and 4,4'-dihydroxydiphenyl methane.

2. The aqueous dispersion of claim 1 which has a solids content of film-forming polymers about 5–15% by weight and a pH of about 7–8.5.

3. The aqueous dispersion of claim 2 in which the acrylic polymer consists essentially of an alkyl methacrylate, an alkyl acrylate, styrene, a hydroxy containing compound selected from the group consisting of a hydroxyalkyl methacrylate, and a hydroxyalkyl acrylate in which the alkyl groups of said acrylic polymer contain 1–8 carbon atoms and in which the melamine derivative is tetrakisethoxymethylbismethoxymethyl melamine.

4. The aqueous dispersion of claim 2 in which the alkyd resin is the reaction product of isopropylidene dicyclohexanol, dehydrated castor oil, pentane diol and trimellitic anhydride and the thermosetting resin is a tetrakisethoxymethylbismethoxymethyl melamine.

5. The aqueous dispersion of claim 2 in which the epoxy ester resin is the reaction product of an epoxy resin, soya oil fatty acids, trimellitic anhydride and the thermosetting resin is tetrakisethoxymethyl bismethoxymethyl melamine.

6. An aqueous replenishment concentrate adapted for dispersing in an aqueous electrocoating bath having a pH of about 5–10 and comprising water and about 20–70% by weight of the film-forming polymers of claim 1 and about 1–10% by weight based on the weight of the film-forming polymers of a water-soluble basic compound selected from the group consisting of ammonia, a water-soluble metal hydroxide, a water-soluble amine, a water-soluble polyamine, and a water-soluble hydroxy amine and containing a uniformly dispersed polytetrafluoroethylene particle in a fluorocarbon polymer to carboxylic acid polymer ratio of about 5:100 to 50:100.

References Cited

UNITED STATES PATENTS

| | | | |
|---|---|---|---|
| 2,800,447 | 7/1957 | Graham | 204—181 |
| 3,223,659 | 12/1965 | Curtice et al. | 260—22 |
| 3,230,162 | 1/1966 | Gilchrist | 204—181 |
| 3,382,165 | 5/1968 | Gilchrist | 204—181 |
| 3,403,088 | 9/1968 | Hart | 204—181 |
| 3,506,601 | 4/1970 | Sekmakas | 260—21 |
| 3,556,972 | 1/1971 | Seitz | 204—181 |

FOREIGN PATENTS

| | | | |
|---|---|---|---|
| 723,072 | 2/1955 | Great Britain | 204—181 |
| 797,001 | 6/1958 | Great Britain | 204—181 |
| 797,551 | 7/1958 | Great Britain | 204—181 |

JAMES A. SEIDLECK, Primary Examiner

R. W. GRIFFIN, Assistant Examiner

U.S. Cl. X.R.

117—132 BE, 132 BF, 132 CF, 161 K, 161 L, 161 LN, 161 UC, 161 ZB; 204—181; 260—18 EP, 19 R, 22 CQ, 23 AR, 29.2 EP, 29.2 E, 29.3, 29.4 UA, 29.4 R, 32.4, 32.6 R, 32.6 N